US012801671B2

(12) United States Patent
Cherry et al.

(10) Patent No.: US 12,801,671 B2
(45) Date of Patent: Nov. 17, 2026

(54) SYSTEM AND METHOD FOR ASSISTING A USER ON A COMPUTER-IMPLEMENTED USER PLATFORM

(71) Applicant: BATON SIMULATIONS, Chateauguay (CA)

(72) Inventors: Sebastien Cherry, Saint-Lambert (CA); Stephane Gosselin, Montreal (CA)

(73) Assignee: BATON SIMULATIONS, Châteauguay (CA)

( * ) Notice: Subject to any disclaimer, the term of this patent is extended or adjusted under 35 U.S.C. 154(b) by 126 days.

(21) Appl. No.: 18/740,060

(22) Filed: Jun. 11, 2024

(65) Prior Publication Data

US 2025/0378116 A1 Dec. 11, 2025

(51) Int. Cl.
*G06F 16/906* (2019.01)

(52) U.S. Cl.
CPC .................................. *G06F 16/906* (2019.01)

(58) Field of Classification Search
CPC ............................... G06F 16/906; G06F 16/90
See application file for complete search history.

(56) References Cited

U.S. PATENT DOCUMENTS 11,676,231 B1 * 6/2023 Crouse .................. G06F 16/906 707/723
2006/0123045 A1 * 6/2006 Chang ..................... G06F 40/56 707/999.102
2010/0138826 A1 * 6/2010 Heidel ...................... G06F 8/61 717/175
2020/0073895 A1 * 3/2020 Vira ...................... G06F 16/906
2020/0302936 A1 * 9/2020 Abu Asba ............... G10L 15/30
2023/0196033 A1 * 6/2023 Robert Jose ............ G06F 40/30 704/9
2023/0229865 A1 * 7/2023 Dhotre ............. G06F 16/24522 704/9
2025/0095641 A1 * 3/2025 Piskala ............... G06F 16/3329

* cited by examiner

*Primary Examiner* — Sherief Badawi
*Assistant Examiner* — J Mitchell Curran
(74) *Attorney, Agent, or Firm* — BCF LLP

(57) ABSTRACT

Method and systems for assisting a user on a computer-implemented user platform. The method includes receiving a user input from a user and determining an input category of the user input. In response to the input category being a first input category, the method includes accessing a first database hosting static computer files associated with document embeddings, determining a relatedness score for each static computer file and returning an indication of at least one of the static computer files based on the relatedness scores to the user. In response to the input category being a second input category, the method includes accessing a second database hosting executable dynamic computer files associated with service embeddings mapping a function thereof, determining a relatedness score for each dynamic computer file, executing at least one dynamic computer file and returning an indication of an output of the execution to the user.

17 Claims, 6 Drawing Sheets

SYSTEM AND METHOD FOR ASSISTING A USER ON A COMPUTER-IMPLEMENTED USER PLATFORM

FIELD

The present technology relates to systems and methods for providing assistance to user of computer systems. In particular, a system and methods for assisting a user on a computer-implemented user platform are disclosed.

BACKGROUND

Today's computer-implemented platforms offer a vast array of functions and services, both online and offline. However, a problem still lies in unclear and time-consuming nature of features that those platforms offer. With each platform having its own interface and operational methods, users often find themselves spending considerable time navigating through them.

This issue is exacerbated for novice users. Such users struggle to discover the available features, leading to frustration and inefficiency in utilizing their devices effectively. Consequently, existing platforms often present users with convoluted interfaces, making it challenging for them to access the full range of functionalities efficiently.

Even though the recent developments identified above may provide benefits, improvements for efficient training of user about how to use a given platform are still desirable.

SUMMARY

Implementations of the present technology have been developed based on developers' appreciation of shortcomings associated with the prior art.

In a first broad aspect of the present technology, there is provided a computer-implemented method for assisting a user on a computer-implemented platform, the method comprising: receiving a user input from a user; determining an input category of the user input among a plurality of pre-determined input categories; in response to the input category being a first input category: accessing a first database configured to host a plurality of static computer files, each static computer file being associated with a document embedding mapping a content of the associated static computer file; determining a first relatedness score for each static computer file based on a comparison of an input embedding associated with the user input with the document embeddings of the plurality of static computer files; and returning a first indication of at least one of the static computer files based on the first relatedness scores to the user; and in response to the input category being a second input category, the second input category being distinct from the first input category: accessing a second database configured to host a plurality of executable dynamic computer files, each dynamic computer file being associated with a service embedding mapping a function of the associated dynamic computer file; determining a second relatedness score for each dynamic computer file based on a comparison of the input embedding with the service embeddings of the plurality of dynamic computer files; executing at least one dynamic computer file based on the second relatedness scores; and returning a second indication of an output of the execution of the at least one dynamic computer file to the user.

In some embodiments of the method, returning the first indication of at least one of the static computer files based on the first relatedness scores comprises: comparing the first relatedness scores associated with the static computer files; identifying a set of a pre-determined number of static computer files based on the comparison; accessing a content of the set of static computer files, the content of each static computer file comprising sections associated with a section embedding; determining a third relatedness score for each section of static computer file based on a comparison of the input embedding with the corresponding section embedding; and returning one or more sections of the set of static computer files based on the third relatedness scores.

In some embodiments of the method, returning one or more sections of the set of static computer files comprises: inputting the one or more sections and the user input into a natural language processing (NLP) service configured to receive sections of static computer files as an input; and returning an output of the NLP service to the user.

In some embodiments of the method, the NLP service is further configured to receive a current content of the computer-implemented user platform as a second input, the output of the NLP service being at least in part based on the current content.

In some embodiments of the method, each dynamic computer file is associated with a dynamic computer file category among a plurality of dynamic computer file categories comprising: a machine learning model category, a contextual file category, a given contextual file including dynamic content of the computer-implemented user platform, and a network communication service category.

In some embodiments of the method, executing at least one dynamic computer file based on the second relatedness scores comprises: executing at least one dynamic computer file of a first file category based on the second relatedness scores; and in response to an output of the at least one dynamic computer file of the first category being invalid: executing at least one dynamic computer file of a second file category based on the second relatedness scores.

In some embodiments of the method, executing at least one dynamic computer file of a first file category based on the second relatedness scores comprises: inputting a contextual file and the user input into a natural language processing (NLP) service, the contextual file being selected based on the input of the user; and returning an output of the NLP service to the user.

In some embodiments of the method, the method further comprises, in response to the input category being a third input category, the third input category being distinct from the first and second input categories: accessing a third database configured to host a plurality of operation template computer files, each operation template computer file being associated with a transaction embedding mapping a function of an associated operation; determining a fourth relatedness score for each operation template computer file based on a comparison of the input embedding with the transaction embeddings of the plurality of operation template computer files; selecting at least one operation template computer file based on the fourth relatedness scores; returning a set of executable operation instructions based on an application of the input to the at least one operation template computer file to the user.

In some embodiments of the method, the method further comprises, in response to the input category being a fourth input category, the fourth input category being distinct from the first, second and third input categories: inputting a dynamic computer file in a machine learning algorithm (MLA), the MLA being configured to receive a dynamic computer file as an input and output a formatted data structure wrapped in a prompt generated based on the user input; inputting the prompt to a natural language processing (NLP) service; and returning an output of the NLP service to the user.

In some embodiments of the method, determining the input category of the input is based on keywords of the input.

In some embodiments of the method, determining a first relatedness score for each static computer file and determining a second relatedness score for each dynamic computer file comprises: determining a cosine similarity between the input embedding and the document embedding, and between the input embedding and the service embedding, respectively.

In some embodiments of the method, determining an input category comprises: determining a confidence score for each input category for the given input, the confidence score being indicative of a probability that the input belong to the input category; if the confidence score is below a pre-determined threshold: accessing a temporal series of historical input entered by the user; identifying a first historical input directly preceding the input; and determining a second input of the first historical input, and wherein determining an input category of the input is further based on the first historical input and the second input.

In at least another aspect of the present technology, there is provided a system for assisting a user on a computer-implemented platform, the system comprising a processor being configured to execute the methods set forth above.

In at least yet another aspect of the present technology, there is provided a computer-readable medium comprising instructions which upon being executed by a processor causes execution of the methods set forth above.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "user device" is any computer hardware that is capable of running software appropriate to the relevant task at hand. Thus, some (non-limiting) examples of user devices include personal computers (desktops, laptops, netbooks, etc.), smartphones, and tablets, as well as network equipment such as routers, switches, and gateways. It should be noted that a device acting as a user device in the present context is not precluded from acting as a server to other user devices. The use of the expression "a user device" does not preclude multiple user devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
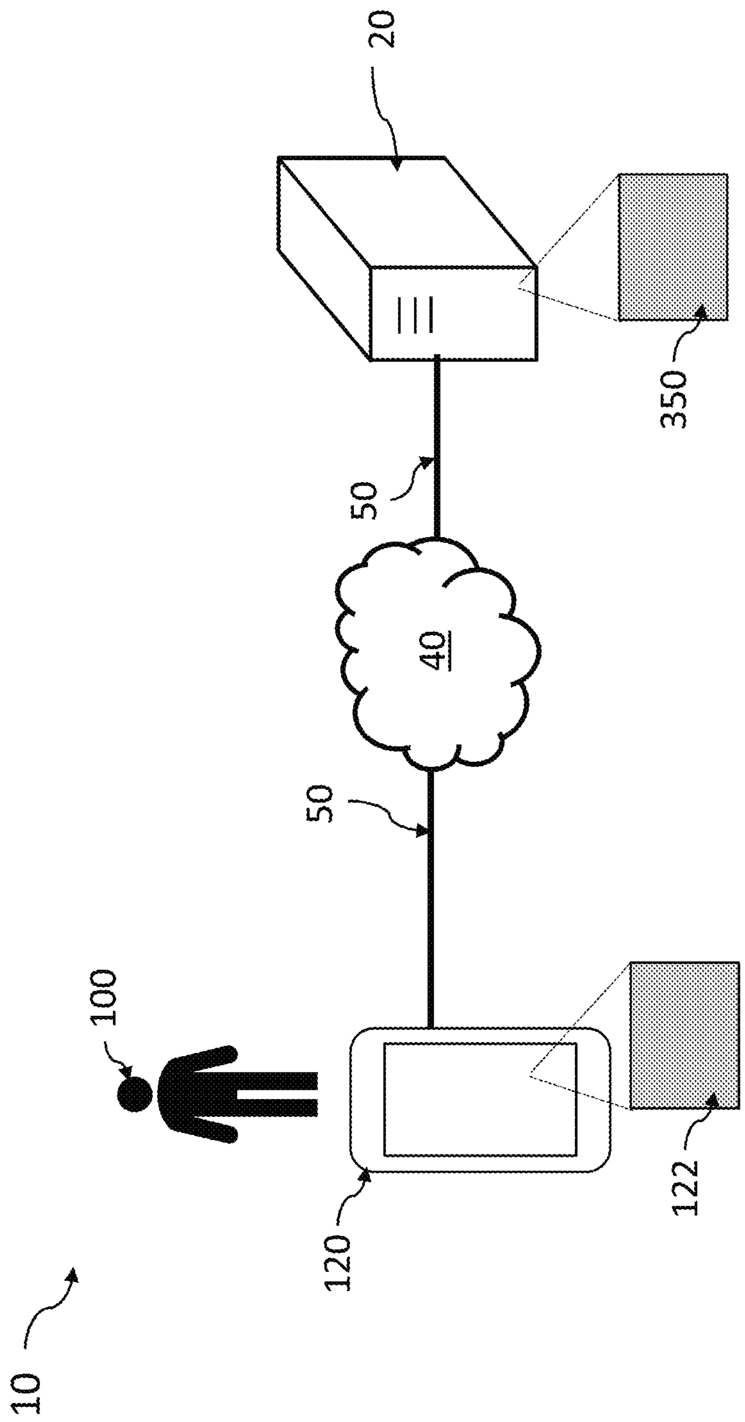
FIG. 1 is a schematic representation of computing environment in accordance with non-limiting implementations of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes that may be substantially represented in non-transitory computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some implementations of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

In an aspect, the present technology provides methods for assisting a user on a computer-implemented user platform. Implementations of the present technology thus provide techniques for enabling a user to enter instructions, receive information through the platform and/or receive insights about how to use the platform. To do so, the user may use a respective user device to access said platform over the Internet for instance.

With these fundamentals in place, we will now consider some non-limiting examples to illustrate various implementations of aspects of the present technology.

Referring to FIG. 1, there is shown a schematic diagram of a computing environment 10, the computing environment 10 being suitable for implementing non-limiting implementations of the present technology. It is to be expressly understood that the computing environment 10 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the computing environment 10 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the computing environment 10 may provide in certain instances simple implementations of the present technology, and that where such is the case they have been presented in this manner as an aid to understanding. As persons skilled in the art would understand, various implementations of the present technology may be of a greater complexity.

Generally speaking, the computing environment 10 is configured to provide assistance to users of a computer-implemented user platform 350. In this illustrative implementation, the computer-implemented platform 350 is hosted by a server 20. As such, any system variation configured to enable assistance of users on a computer-implemented platform can be adapted to execute implementations of the present technology, once teachings presented herein are appreciated.

In this implementation, the computer-implemented platform 350 may be an integrated suite of enterprise software solutions designed to support various business functions and processes. For example, the computer-implemented platform 350 may be a Systems, Applications, and Products (SAP) platform. The computer-implemented platform 350 may be used by the user 100 to execute core business functions such as finance, human resources, procurement, manufacturing, supply chain management, to manage customer interactions, sales, marketing, and service activities, to gather, analyze, and visualize data for informed decision-making and/or to perform any other suitable operations.

The computing environment 10 includes at least one electronic device 120 associated with a user 100. As such, the electronic device 120 can sometimes be referred to as a "client device", "user device" or "client electronic devices". It should be noted that the fact that the electronic device 120 is associated with the user 100 does not need to suggest or imply any mode of operation—such as a need to log in, a need to be registered, or the like. It should be appreciated that in other implementations, the environment 10 can include additional users and user devices.

The implementation of the electronic device 120 is not particularly limited, but as an example, the electronic device 120 may be implemented as a personal computer (desktops, laptops, netbooks, etc.), a wireless communication device (such as a smartphone, a cell phone, a tablet and the like), as well as network equipment (such as routers, switches, and gateways). The electronic device 120 includes hardware and/or software and/or firmware (or a combination thereof), as is known in the art, to execute a communication application 122 respectively. Generally speaking, the purpose of the communication application 122 is to enable the users 100 to access the platform 350 hosted on the server 20.

Figure 2:
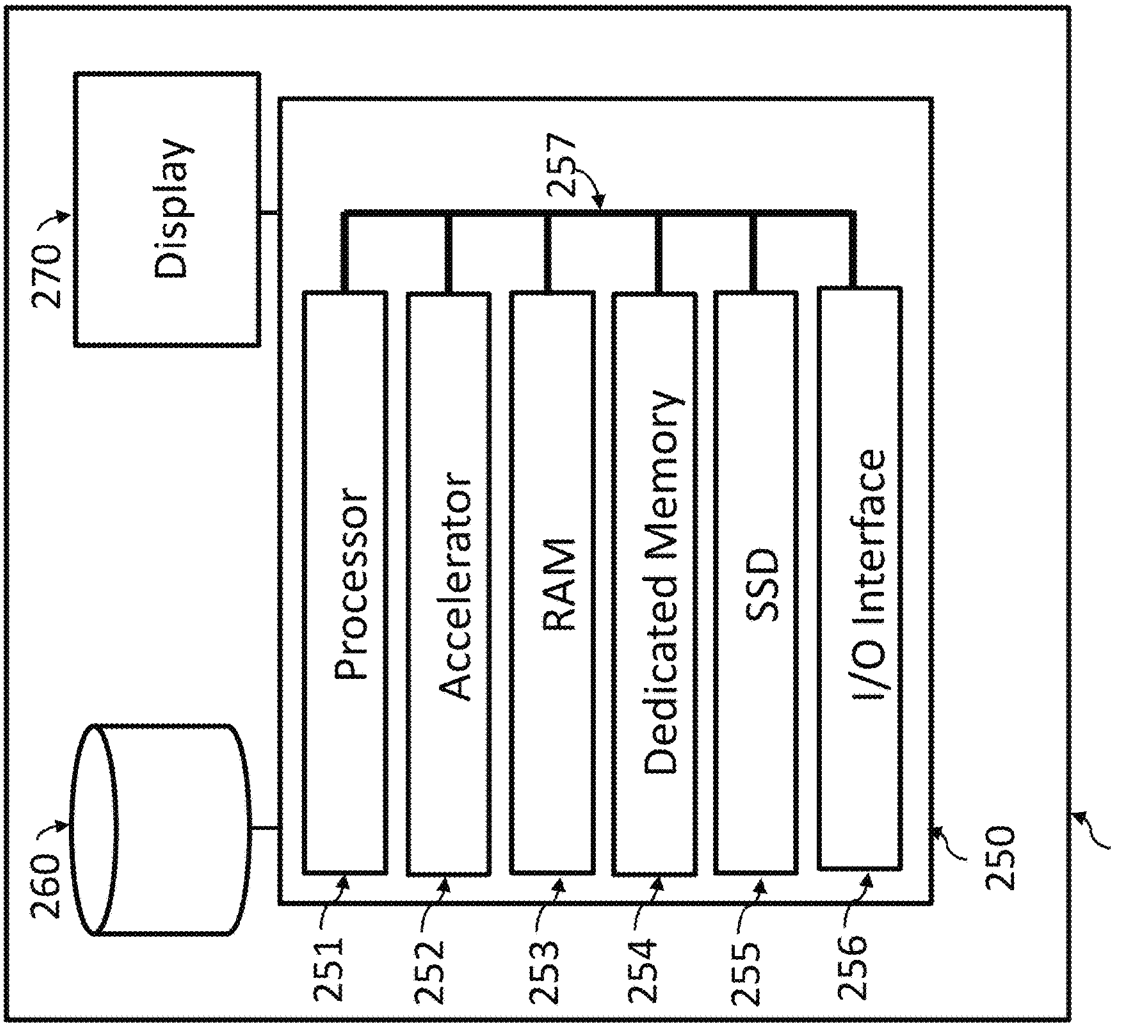
FIG. 2 is a schematic representation of a user device configured for accessing a communication platform in accordance with an implementation of the present technology.

FIG. 2 is a schematic representation of the user device 120 in accordance with an implementation of the present technology. The user device 120 includes a computing unit 250. In some implementations, the computing unit 250 may be implemented by any of a conventional personal computer, a controller, and/or an electronic device (e.g., a server, a controller unit, a control device, a monitoring device etc.) and/or any combination thereof appropriate to the relevant task at hand. In some implementations, the computing unit 250 comprises various hardware components including one or more single or multi-core processors collectively represented by a processor 251, a solid-state drive 255, a RAM 253, a dedicated memory 254 and an input/output interface 256. The computing unit 250 may be a generic computer system.

In some other implementations, the computing unit 250 may be an "off the shelf" generic computer system. In some implementations, the computing unit 250 may also be distributed amongst multiple systems. The computing unit 250 may also be specifically dedicated to the implementation of the present technology. As a person in the art of the present technology may appreciate, multiple variations as to how the computing unit 250 is implemented may be envisioned without departing from the scope of the present technology.

Communication between the various components of the computing unit 250 may be enabled by one or more internal and/or external buses 257 (e.g. a PCI bus, universal serial bus, IEEE 1394 "Firewire" bus, SCSI bus, Serial-ATA bus, ARINC bus, etc.), to which the various hardware components are electronically coupled.

The input/output interface 256 may provide networking capabilities such as wired or wireless access. As an example, the input/output interface 256 may comprise a networking interface such as, but not limited to, one or more network ports, one or more network sockets, one or more network interface controllers and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 220 stores program instructions suitable for being loaded into the RAM 230 and executed by the processor 251. Although illustrated as a solid-state drive 255, any type of memory may be used in place of the solid-state drive 255, such as a hard disk, optical disk, and/or removable storage media.

The processor 251 may be a general-purpose processor, such as a central processing unit (CPU) or a processor dedicated to a specific purpose, such as a digital signal processor (DSP). In some implementations, the processor 251 may also rely on an accelerator 252 dedicated to certain given tasks, such as executing the methods set forth in the paragraphs below. In some implementations, the processor 251 or the accelerator 252 may be implemented as one or more field programmable gate arrays (FPGAs). Moreover, explicit use of the term "processor", should not be construed to refer exclusively to hardware capable of executing software, and may implicitly include, without limitation, application specific integrated circuit (ASIC), read-only memory (ROM) for storing software, RAM, and non-volatile storage. Other hardware, conventional and/or custom, may also be included.

Further, the user device 120 may include a screen or display 270 capable of rendering an interface of the computer-platform 350 and/or the communication application 122. In some implementations, display 270 may comprise and/or be housed with a touchscreen to permit users to input data via some combination of virtual keyboards, icons, menus, or other Graphical User Interfaces (GUIs). In some implementations, display 270 may be implemented using a Liquid Crystal Display (LCD) display or a Light Emitting Diode (LED) display, such as an Organic LED (OLED) display. The device may be, for example, an iPhone® from Apple or a Galaxy® from Samsung, or any other mobile device whose features are similar or equivalent to the aforementioned features. The device may be, for example and without being limitative, a handheld computer, a personal digital assistant, a cellular phone, a network device, a smartphone, a navigation device, an e-mail device, a game console, or a combination of two or more of these data processing devices or other data processing devices.

The user device 120 may include a memory 260 communicably connected to the computing unit 250 and configured to store data, settings of the communication application, or any other information relevant for running the communication application on the user device 120. The memory 260 may be embedded in the user device 120 as in the illustrated implementation of FIG. 2 or located in an external physical location. Information representative of the communication application 122 may be stored in the memory 260. The computing unit 250 may be configured to access a content of the memory 260 via a network (not shown) such as a Local Area Network (LAN) and/or a wireless connection such as a Wireless Local Area Network (WLAN).

The user device 120 may also include a power system (not depicted) for powering the various components. The power system may include a power management system, one or more power sources (e.g., battery, alternating current (AC)), a recharging system, a power failure detection circuit, a power converter or inverter and any other components associated with the generation, management and distribution of power in mobile or non-mobile devices.

Returning to the description of FIG. 1, the user device 120 is communicatively coupled to the server 20 over a communication network 40 via any wired or wireless communication link 50 including, for example, 4G, LTE, Wi-Fi, or any other suitable connection. In some non-limiting implementations of the present technology, the communication network 40 may be implemented as the Internet. In other implementations of the present technology, the communication network 40 can be implemented differently, such as any wide-area communication network, local-area communication network, a private communication network and the like.

How the communication links 50 between the user device 120 and the server 20 is implemented will depend inter alia on how the user device 120 and the server 20 are implemented. Merely as an example and not as a limitation, in those implementations of the present technology where the user device 120 is implemented as a wireless communication device (such as a smartphone), the connection 50 between said user device 120 and the server 20 can be implemented as a wireless communication link (such as but not limited to, a 3G communication network link, a 4G communication network link, Wireless Fidelity, or WiFi® for short, Bluetooth® and the like). In those examples where the user device 120 is implemented as a notebook computer, the corresponding communication link can be either wireless (such as Wireless Fidelity, or WiFi® for short, Bluetooth® or the like) or wired (such as an Ethernet based connection).

The server 20 may be implemented as a conventional computer server. In an example of an implementation of the present technology, the server 20 may be implemented as a Dell™ PowerEdge™ Server running the Microsoft™ Windows Server™ operating system. Needless to say, the server 20 may be implemented in any other suitable hardware, software, and/or firmware, or a combination thereof. In the depicted non-limiting implementations of the present technology, the server 20 is a single server. In alternative non-limiting implementations of the present technology, the functionality of the server 20 may be distributed and may be implemented via multiple servers.

Generally speaking, the server 20 is configured to host the computer-implemented platform 350, receive instructions and commands from the user device 120 and communicate therewith. The server 20 may comprise one or more processors configured to manage access and interaction of the users with the computer-implemented platform 350.

Figure 3:
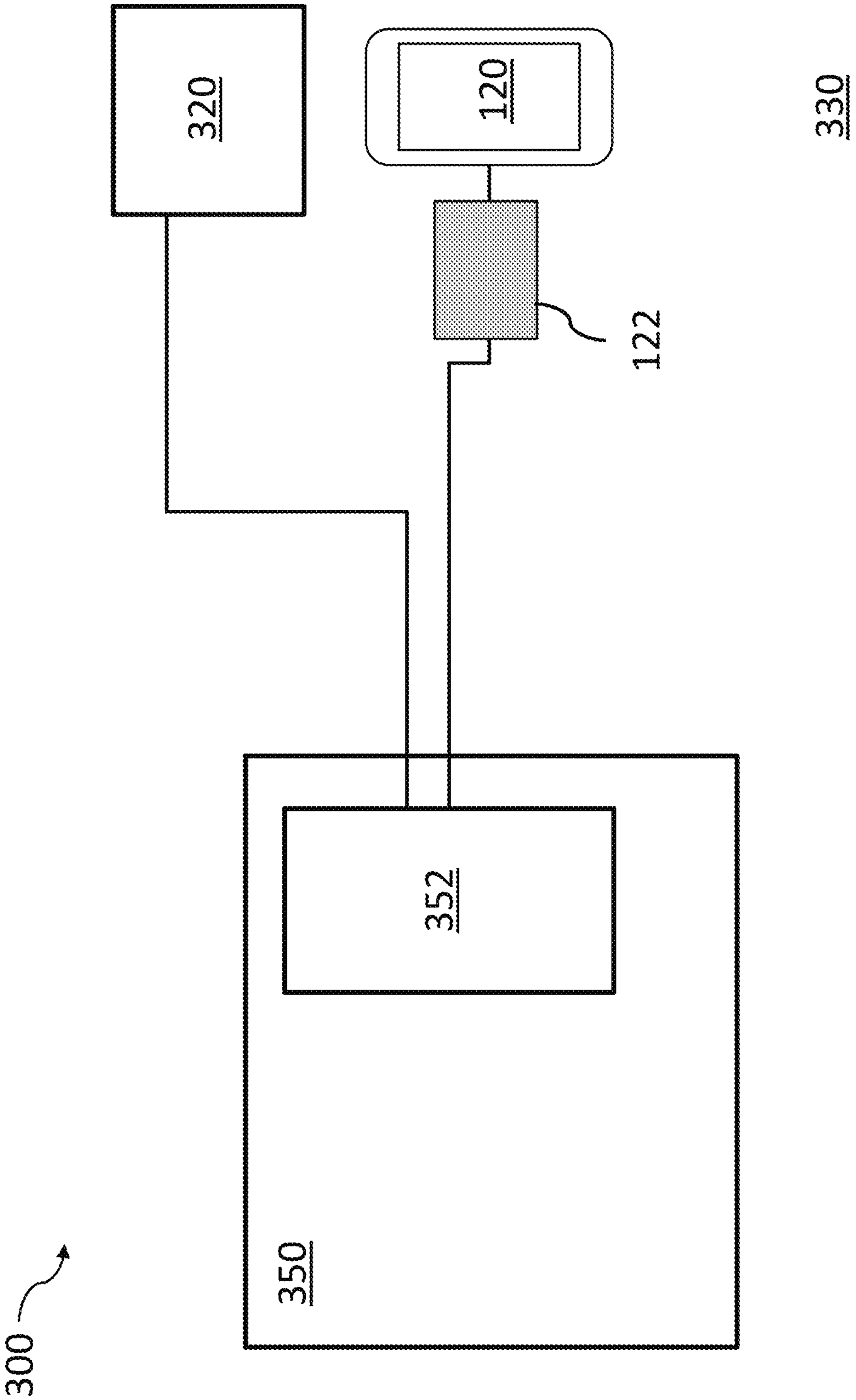
FIG. 3 is schematic representation of an architecture of a computer-implemented platform in accordance with non-limiting implementations of the present technology.

With reference to FIG. 3, the computer-implemented platform 350 includes an interface module 352 for interacting with the user device 120. In this implementation, the user 100 may for example interact with a chatbot implemented by the interface module 352 such that the user 100 may transmit inputs thereto, thereby forming a textual and/or visual interaction between the user and the chatbot. The computer-implemented platform 350 is also communicably connected to a natural language processing (NLP) machine learning (ML) module 320. The NLP ML module 320 may include Generative Pre-trained Transformer (GPT) models that may generate human-like text based on input prompts. The NLP ML module 320 may thus be referred to as an NLP service.

Broadly speaking, the computer-implemented platform 350 may receive an input from the user device 120 and provide, based on data of the computer-implemented platform 350 and using the NLP ML module 320, assistance to the user of the user device 120 about how to use the computer-implemented platform 350. For example, the communication application 122 may be a simulation application 122 designed to provide users with practical experience in enterprise resource planning (ERP) concepts and processes on the computer-implemented platform 350. Interacting with the computer-implemented platform 350 through the simulation application 122 may be executed to provide virtual business environment where users interact with ERP software to manage various aspects of business operations. For example, the simulation application 122 may be SAP S/4HANA.

Figure 4:
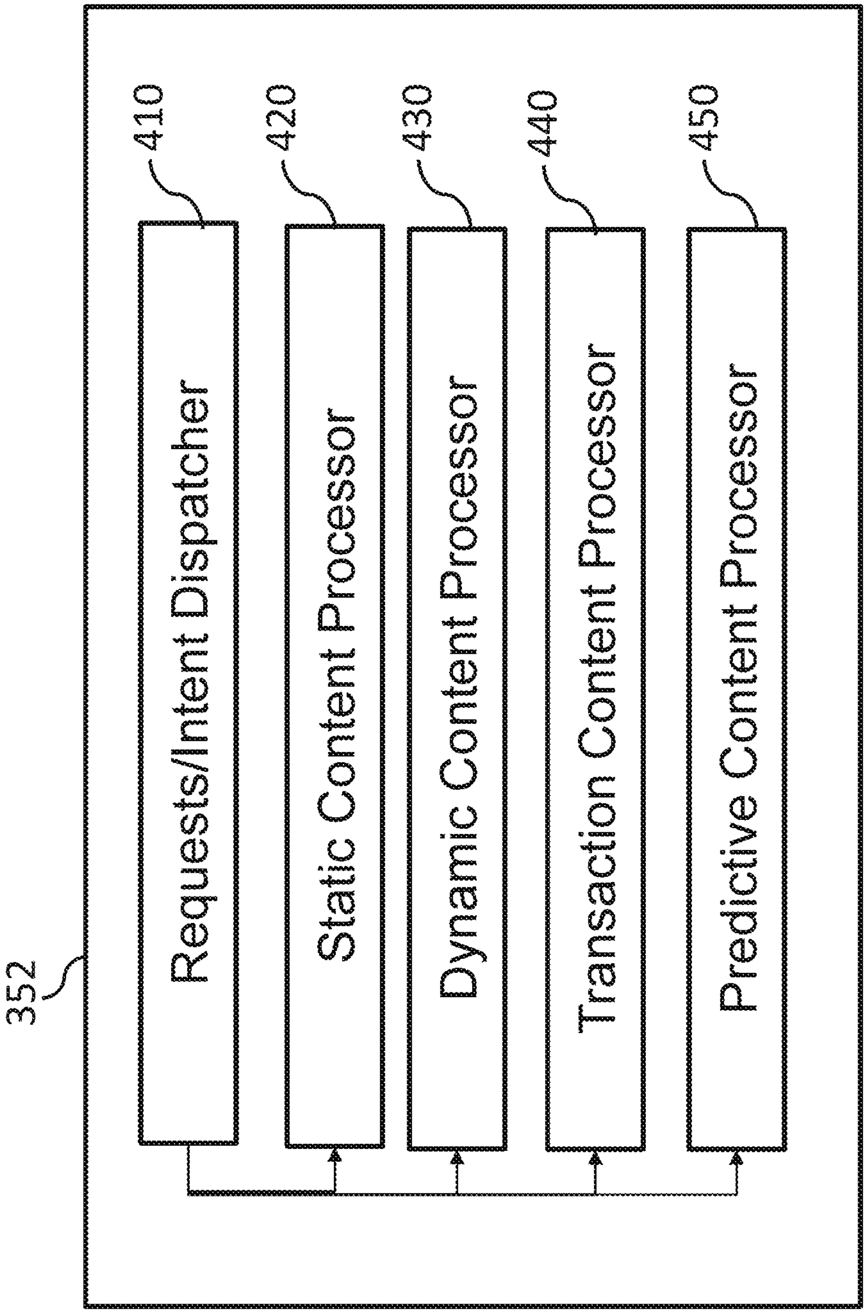
FIG. 4 is a block diagram of an interface module of the computer-implemented platform of FIG. 3 in accordance with non-limiting implementations of the present technology.

FIG. 4 is a schematic representation of the interface module 352 in accordance with some non-limiting implementations of the present technology. In use, the interface module 352 receives an input from the user device 120. A request/intent dispatching module 410 of the interface module 352 determines an input category of the user input among a plurality of pre-determined input categories. To do so, the request/intent dispatching module 410 may employ a machine learning algorithm trained to determine an input category of an input based on a lexicon of the input. For example, the input category may be determined based on keywords of the user input. It can be said that the request/intent dispatching module 410 determines an "intent" of the user input.

In some implementations, the interface module 352 may receive an input from the user device 120 containing phrases such as "how to" or "how do I". These phrases, being indicative of the user's intent to obtain information on how to perform a task, may be used by the request/intent dispatching module 410 to determine a category for the input, for example, "category 1", wherein "category 1" is from the plurality of pre-determined input categories. Subsequent inputs from the user device 120 which contain words or phrases indicating similar intention would be assigned "category 1".

In some implementations, the interface module 352 may receive an input from the user device 120 containing words such as "what" or "when". These words, being indicative of the user's intent to obtain specific data (for example, numbers, locations etc.) from the system, may be used by the request/intent dispatching module 410 to determine a category for the input, for example, "category 2", wherein "category 2" is from the plurality of pre-determined input categories. Subsequent inputs from the user device 120 which contain words or phrases indicating similar intention would be assigned "category 2".

In some implementations, the interface module 352 may receive an input from the user device 120 that pertains to information currently displayed on the screen 270, such as "what should I do with this?" or "summarize this". These inputs, being indicative of the user's intent to engage with the information on their screen, may be used by the request/intent dispatching module 410 to determine a category for these inputs, for example, "category 3", wherein "category 3" is from the plurality of pre-determined input categories. Subsequent inputs from the user device 120 which contain words or phrases indicating similar intention would be assigned "category 3".

In some implementations, the interface module 352 may receive an input from the user device 120 containing verbs such as "create", "update", "change", "buy", "procure", "release", "schedule", "set", "allocate", "relocate". These verbs, being indicative of the user's intent to execute an operation rather than inquire about how to perform it, may be used by the request/intent dispatching module 410 to determine a category for these inputs, for example, "category 4", wherein "category 4" is from the plurality of pre-determined input categories. Subsequent inputs from the user device 120 which contain verbs, words or phrases indicating similar intention would be assigned "category 4".

In some implementations, in response to the input category being not identified (e.g. identified with a confidence below a pre-determined threshold), the interface module 352 accesses a temporal series of historical input entered by the user. In other words, the interface module 352 accesses previous inputs of the user 100 in the conversation with the chatbot. The interface module 352 may thus additionally use a message or input of the user immediately preceding the user input to determine the input category of the user input. In response to the input category still not being identified, the interface module 352 may continue to access preceding inputs of the user.

Static Processor

In response to the input category being a first input category, the interface module 352 causes execution of a static content processor 420. For example, the first input category includes inputs for which the user queries information about a document relative to the computer-implemented platform 350. In response to the static content processor 420, the interface module 352 accesses a database hosting a plurality of static computer files. Each static computer file is associated with a document embedding mapping a content of the associated static computer file.

Examples of static computer files include online help content created and maintained within a Digital Acceleration Solution (DAS), as well as files in different formats, such as Portable Document Format (PDF), Microsoft Word documents, Microsoft PowerPoint presentations etc., that are provided by a system configurator or system administrator for the purpose of being dissected for embedding calculations (vectoring).

The interface module 352 may determine an embedding of the user input and further determines a target static computer file based on a comparison of the document embeddings with the embedding of the user input. More specifically, a relatedness score is determined, for each static computer file, between the corresponding document embedding and the embedding of the user input. For example, a cosine similarity may be determined to obtain the relatedness score.

In some implementations, the three document embeddings that are the closest to the embedding of the user input are identified, and an identification of the three corresponding static computer files is transmitted to the user 100. The user may thus be provided with the three most relevant static computer files for the given user input.

In some implementation, a content of each static document is divided into a plurality of sections, each section being associated with a given section embedding. A second relatedness score may further be determined for each section based on a comparison of the embedding of the user input and the section embeddings. Therefore, the user 100 may be provided with indication of relevant section (e.g. sections for which the relatedness score is the highest) for the given user input. For example, each page of a PDF file may correspond to a section of said file. The user may thus be provided with a most relevant page of the PDF file for the given user input.

It should be noted that the computer-implemented platform, upon transmitting an indication of a file and/or a section, may employ the NLP ML module 320 to generate a natural language response to the user input, and provide said natural language response to the user 100. Both of the user input and the indication of the static computer file and/or the section may be transmitted to the NLP ML module 320.

Dynamic Processor

In response to the input category being a second input category, the interface module 352 causes execution of a dynamic content processor 430. For example, the second input category includes inputs for which the user queries information about a service relative to the computer-implemented platform 350. In response to the dynamic content processor 430, the interface module 352 accesses a database hosting a plurality of dynamic computer files. Each dynamic computer file is associated with a service embedding mapping a function of the associated dynamic computer file.

Examples of dynamic computer files include a summary of dynamic data provided by robots, data that can be consumed from Open Data protocol (OData) datasources, pre-configured machine learning (ML) models.

For example, a dynamic computer file may be a machine learning model (MLM), a contextual file or a network communication service. In the context of the present disclosure, a contextual file includes information currently available to the user on the computer-implemented platform 350. For example, a rendering of the computer-implemented platform 350 may include variables that are updated in a near-to-real-time manner (e.g. sales of a company). A contextual file may include information about current values of one or more of those variables. It can be said that a given contextual file includes dynamic content of the computer-implemented user platform. Network communication services may include Open Data protocol (OData) datasources. A contextual file may thus include current content of the computer-implemented user platform 350.

Therefore, in this example, each of the dynamic computer files may be associated with a dynamic computer file category: a machine learning model category, a contextual file category, and a network communication service category.

The interface module 352 may determine an embedding of the user input and further determines a target dynamic computer file based on a comparison of the service embeddings with the embedding of the user input. More specifically, a relatedness score is determined, for each dynamic computer file, between the corresponding service embedding and the embedding of the user input. For example, a cosine similarity may be determined to obtain the relatedness score.

In some implementations, the three service embeddings that are the closest to the embedding of the user input are identified, and an identification of the three corresponding dynamic computer files is transmitted to the user 100. The user may thus be provided with the three most relevant dynamic computer files for the given user input.

In the same or other implementations, a first target dynamic computer file is identified in the machine learning model category and further executed. In response to an output of the first target dynamic computer file being invalid, a second target dynamic computer file is identified in the contextual file category and/or the network communication service category and further executed.

Once a dynamic computer file has been executed, both of the user input and the output of the dynamic computer file may be transmitted to the NLP ML module 320 to generate a natural language response to the user input, and provide said natural language response to the user 100.

Transaction Processor

In response to the input category being a third input category, the interface module 352 causes execution of a transaction content processor 440. For example, the third input category includes inputs for which the user queries information about an operation (e.g. a business transaction) executable through the computer-implemented platform 350. In response to the transaction content processor 440, the interface module 352 accesses a database hosting a plurality of operation template computer files. Each operation template computer file is associated with a transaction embedding mapping a function of the associated operation template computer file.

For example, an operation template computer file may include a template that, upon completion, is indicative of a transaction such as a buy of a given number of a specific item to a specific item provider. Examples of this template include a JavaScript Object Notation (JSON) object specifying the parameters of a function to create purchase orders. Furthermore, in this example, each of the dynamic computer files may be associated with a dynamic computer file category: a machine learning model category, a contextual file category, and a network communication service category.

The interface module 352 may determine an embedding of the user input and further determines a target operation template computer file based on a comparison of the transaction embeddings with the embedding of the user input. More specifically, a relatedness score is determined, for each dynamic computer file, between the corresponding transaction embedding and the embedding of the user input. For example, a cosine similarity may be determined to obtain the relatedness score.

In some implementations, the three transaction embeddings that are the closest to the embedding of the user input are identified, and an identification of the three corresponding operation template computer files is transmitted to the user 100. The user may thus be provided with the three most relevant operation template computer file for the given user input.

Once a target operation template computer file has been identified, both of the user input and the target operation template computer file may be transmitted to the NLP ML module 320 to generate a natural language response to the user input, and provide said natural language response to the user 100. An executable transaction (e.g. a JSON file) may also be generated based on the user input and the target operation template computer file. For example, a set of executable operation instructions may be returned to the user based on an application of the user input to the at least one operation template computer file. Therefore, in the previous example, the user may be provided with an executable file that, upon execution by the user 100, cause an order to be filed of the given number of the specific item to the specific item provider.

Predictive Processor

In response to the input category being a fourth input category, the interface module 352 causes execution of a predictive content processor 450. For example, the fourth input category includes inputs for which the user queries predictive insights relative to the computer-implemented platform 350. In response to the predictive content processor 450, the interface module 352 accesses a database hosting a plurality of machine learning algorithms (MLA). Each MLA is associated with an MLA embedding mapping a function of the associated MLA. In some implementations, each MLA is configured to receive a dynamic computer file as an input and output a formatted data structure wrapped in a prompt generated based on user input.

Examples of computer files processed by the predictive content processor 450 include configurations of machine learning models distributed across multiple database tables. For instance, when a user requests purchase orders to be made based on his/her purchase history and current inventory data, the predictive content processor 450 identifies which ML model can provide the necessary response and also returns the data source to be queried to the user interface side so that it can be accessed with the user's credentials. This data is then returned by the predictive content processor 450 to a server such that it is used by the ML model executed on the server, to generate the required predictions.

The interface module 352 may determine an embedding of the user input and further determines a target MLA based on a comparison of the MLA embeddings with the embedding of the user input. More specifically, a relatedness score is determined, for each MLA, between the corresponding MLA embedding and the embedding of the user input. For example, a cosine similarity may be determined to obtain the relatedness score. The aforementioned dynamic computer file may thus be identified based on the user input and inputted in the target MLA.

Once an MLA has been executed, both of the user input and the output of the MLA may be transmitted to the NLP ML module 320 to generate a natural language response to the user input, and provide said natural language response to the user 100.

Figure 5A:
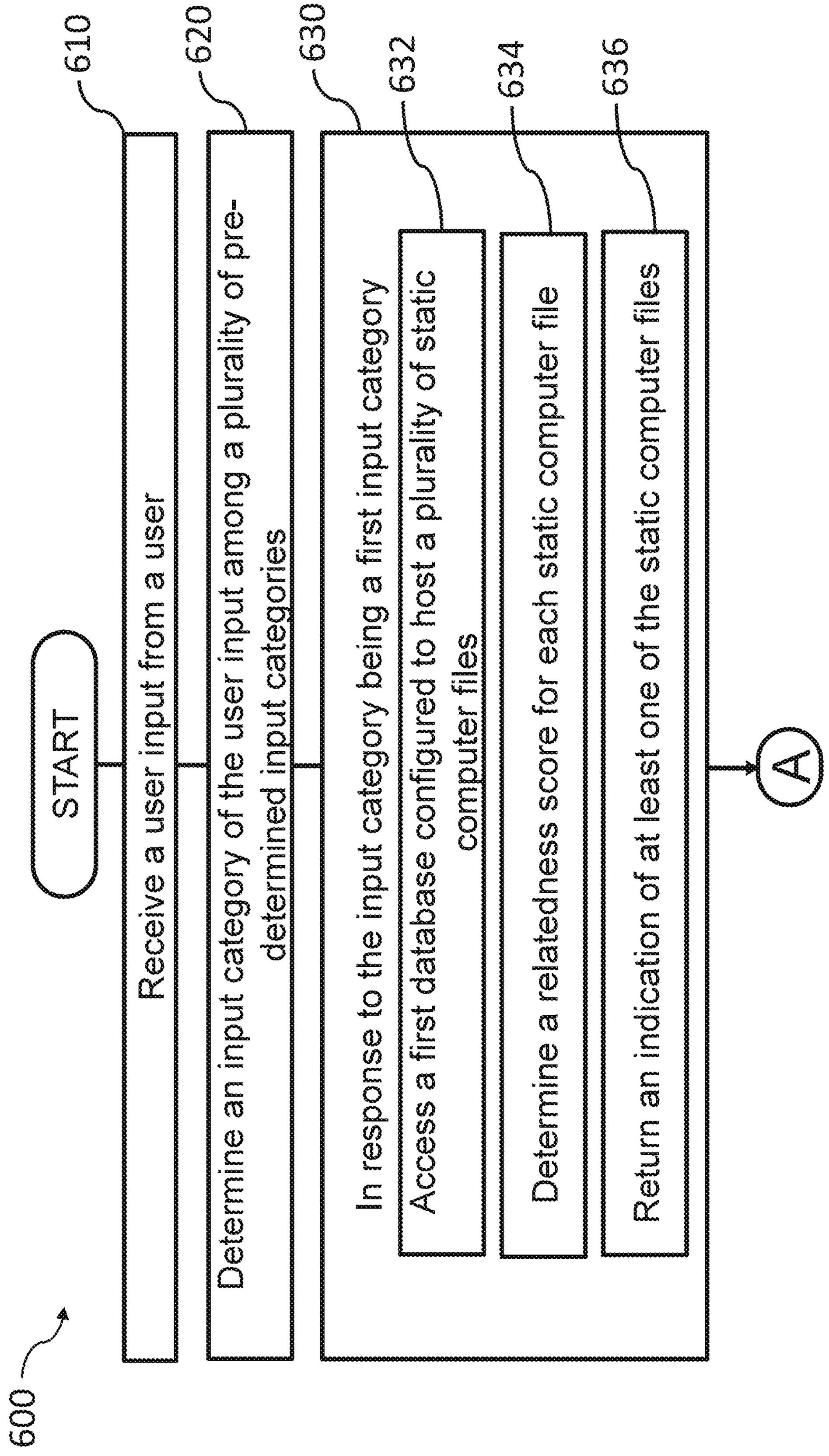
FIGS. 5A and 5B illustrate a flow diagram showing operations of a method for assisting a user on a computer-implemented platform in accordance with non-limiting implementations of the present technology.
Figure 5B:
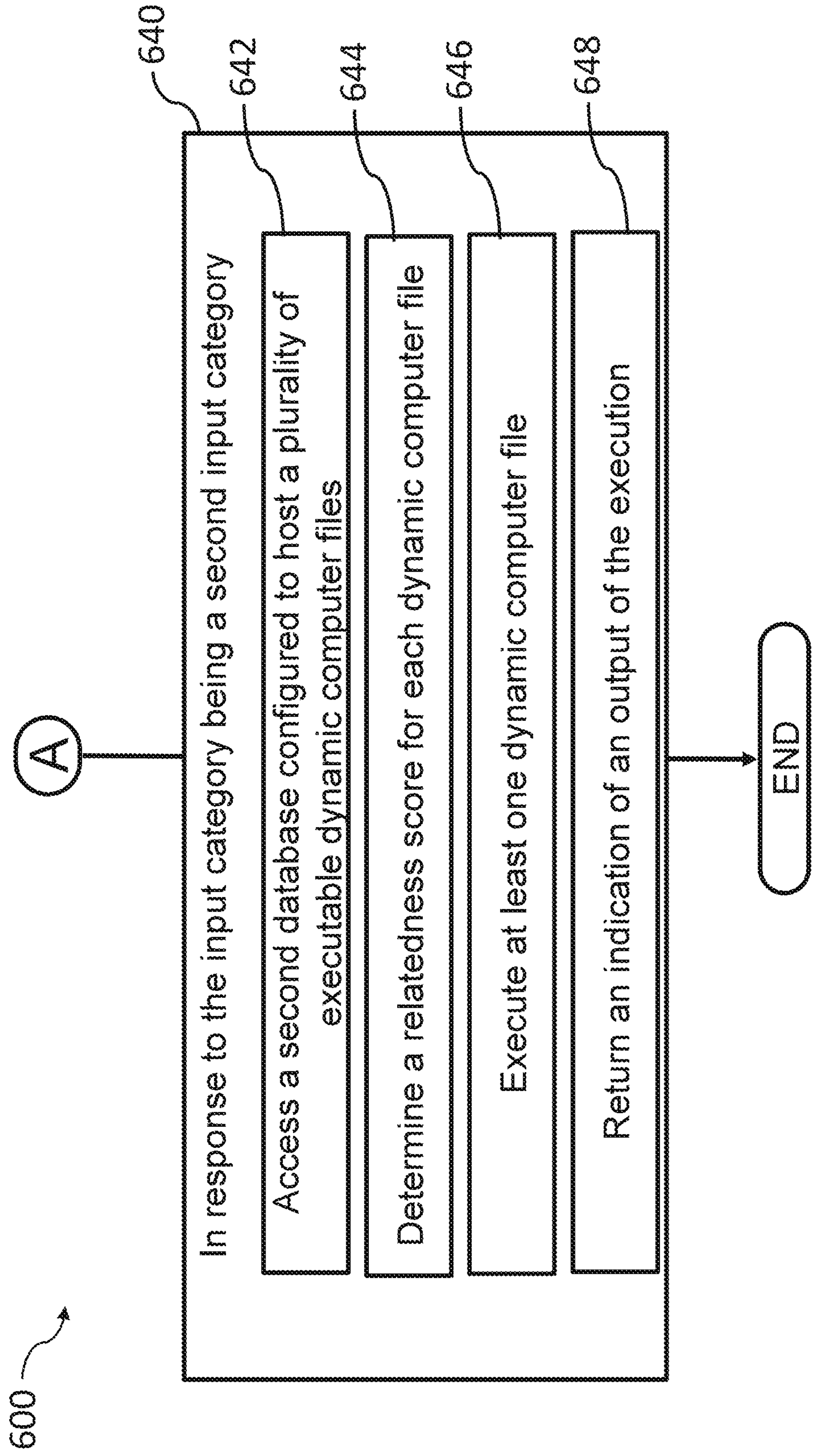

FIGS. 5A and 5B are flow diagrams of a method 600 for assisting a user on a computer-implemented user platform, such as the computer-implemented user platform 350, according to some implementations of the present technology. In one or more aspects, the method 600 or one or more steps thereof may be performed by a computing unit or a computer system, such as the server 20. The method 600 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

The method 600 starts with receiving, at operation 610, a user input from a user such as the user 100. For example, the user input may be received from a user device such as the user device 120 communicably connected to the server 20 hosting the computer-implemented user platform 350.

The method 600 continues with determining, at operation 620, an input category of the user input among a plurality of pre-determined input categories. In some implementations, determining the input category of the input is based on keywords and/or lexicon of the user input.

In some implementations, the input category may be determined by determining a confidence score for each input category for the given input, the confidence score being indicative of a probability that the input belong to the input category. In response to the confidence score being below a pre-determined threshold, accessing a temporal series of historical input entered by the user, identifying a first historical input directly preceding the input; and determining a second input of the first historical input. The input category of the input may further be based on the first and second input.

At operation 630, in response to the input category being a first input category, the method 600 continues with accessing, at sub-operation 632, a first database configured to host a plurality of static computer files. Each static computer file is associated with a document embedding mapping a content of the associated static computer file. For example, a static computer file may be a PDF file, an image file, or any other suitable static file.

The method 600 continues with determining, at sub-operation 634, a first relatedness score for each static computer file based on a comparison of an input embedding associated with the user input with the document embeddings of the plurality of static computer files.

The method 600 continues with returning, at sub-operation 636, a first indication of at least one of the static computer files based on the first relatedness scores to the user. In some implementations, the content of each static computer file is divided into a plurality of sections, each section being associated with a section embedding mapping a content of the corresponding section.

For example, upon returning the first indication to the user, a set of a pre-determined number of static computer files may be identified based on a comparison of the first relatedness scores associated with the static computer files. A content of the set of static computer files may further be accessed, and a third relatedness score may be determined for each section of static computer file based on a comparison of the input embedding with the corresponding section embedding. One or more sections of the set of static computer files may further be returned to the user based on the second relatedness scores.

Upon returning the first indication to the user, the one or more sections and the user input may be inputted into a natural language processing (NLP) service configured to receive sections of static computer files as an input and an output of the NLP service may be returned to the user.

In some implementations, the NLP may be configured to receive a current content of the computer-implemented user platform as a second input, the output of the NLP being thus at least in part based on the current content.

At operation 640, in response to the input category being a second input category, the second input category being distinct from the first input category, the method 600 continues with accessing, at sub-operation 642, a second database configured to host a plurality of executable dynamic computer files. Each dynamic computer file is associated with a service embedding mapping a function of the associated dynamic computer file.

In some implementations, each dynamic computer file is associated with a dynamic computer file category among a plurality of dynamic computer file categories including a machine learning model category, a contextual file category, a given contextual file including dynamic content of the computer-implemented user platform, and a network communication service category. For example, the user input and a contextual file indicative of a current content of the computer-implemented platform may be inputted into a natural language processing (NLP) service, the contextual file having been selected based on the input of the user and an output of the NLP service may be transmitted to the user.

In some implementations, determining a first relatedness score for each static computer file and determining a second relatedness score for each dynamic computer file includes determining a cosine similarity between the input embedding and the document embedding, and between the input embedding and the service embedding, respectively.

An execution of at least one dynamic computer file based on the second relatedness scores may include executing at least one dynamic computer file of a first file category (e.g. the machine learning model category) based on the second relatedness scores and, in response to an output of the at least one dynamic computer file of the first category being invalid, at least one dynamic computer file of a second file category (e.g. network communication service category) may be identified based on the second relatedness scores and executed.

The method 600 continues with determining, at sub-operation 644, a second relatedness score for each dynamic computer file based on a comparison of the input embedding with the service embeddings of the plurality of dynamic computer files.

The method 600 continues with executing, at sub-operation 646, at least one dynamic computer file based on the second relatedness scores. For example, a target dynamic computer file may be identified as having the highest second relatedness score and further be executed.

The method 600 continues with returning, at sub-operation 648, a second indication of an output of the execution of the at least one dynamic computer file to the user.

In some implementations, the method 600 further includes, in response to the input category being a third input category, the third input category being distinct from the first and second input categories, accessing a third database configured to host a plurality of operation template computer files. Each operation template computer file is associated with a transaction embedding mapping a function of an associated operation. In these implementations, the method 600 also includes determining a fourth relatedness score for each operation template computer file based on a comparison of the input embedding with the transaction embeddings of the plurality of operation template computer files, selecting at least one operation template computer file based on the fourth relatedness scores and returning a set of executable operation instructions based on an application of the input to the at least one operation template computer file to the user.

In the same or other implementations, the method 600 further includes, in response to the input category being a fourth input category, the fourth input category being distinct from the first, second and third input categories, inputting a dynamic computer file in a machine learning algorithm (MLA), the MLA being configured to receive a dynamic computer file as an input and output a formatted data structure wrapped in a generated prompt based on user input, inputting the generated prompt to a natural language processing (NLP) service and returning an output of the NLP service to the user.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every implementation of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method for assisting a user on a computer-implemented platform, the method comprising:
- receiving a user input from the user;
- determining an input category of the user input among a plurality of pre-determined input categories;
- in response to the input category being a first input category:
  - accessing a first database configured to host a plurality of static computer files, each static computer file being associated with a document embedding mapping a content of the associated static computer file;
  - determining a first relatedness score for each static computer file based on a comparison of an input embedding associated with the user input with the document embeddings of the plurality of static computer files; and
  - returning a first indication of at least one of the static computer files based on the first relatedness scores to the user;
- and
- in response to the input category being a second input category, the second input category being distinct from the first input category:
  - accessing a second database configured to host a plurality of executable dynamic computer files, each dynamic computer file being associated with a service embedding mapping a function of the associated dynamic computer file and each dynamic computer file being associated with a dynamic computer file category among a plurality of dynamic computer file categories comprising:
    - a machine learning model category,
    - a contextual file category, a given contextual file including dynamic content of the computer-implemented platform, and
    - a network communication service category;
  - determining a second relatedness score for each dynamic computer file based on a comparison of the input embedding with the service embeddings of the plurality of dynamic computer files;
  - executing at least one dynamic computer file of a first file category based on the second relatedness scores;
  - in response to an output of the at least one dynamic computer file of the first file category being invalid, executing at least one dynamic computer file of a second file category based on the second relatedness scores; and
  - returning a second indication of an output of the execution of the at least one dynamic computer file of the second file category to the user.

2. The method of claim 1, wherein returning the first indication of at least one of the static computer files based on the first relatedness scores comprises:
- comparing the first relatedness scores associated with the static computer files;
- identifying a set of a pre-determined number of static computer files based on the comparison;
- accessing a content of the set of static computer files, the content of each static computer file comprising sections associated with a section embedding;
- determining a third relatedness score for each section of the set of static computer files based on a comparison of the input embedding with the corresponding section embedding; and
- returning one or more sections of the set of static computer files based on the third relatedness scores.

3. The method of claim 2, wherein returning one or more sections of the set of static computer files comprises:
- inputting the one or more sections and the user input into a natural language processing (NLP) service configured to receive sections of static computer files as an input; and
- returning an output of the NLP service to the user.

4. The method of claim 3, wherein the NLP service is further configured to:
- receive a current content of the computer-implemented user platform as a second input, the output of the NLP service being at least in part based on the current content.

5. The method of claim 1, wherein executing at least one dynamic computer file of a first file category based on the second relatedness scores comprises:
- inputting a contextual file and the user input into a natural language processing (NLP) service, the contextual file being selected based on the input of the user; and
- returning an output of the NLP service to the user.

6. The method of claim 1, further comprising, in response to the input category being a third input category, the third input category being distinct from the first and second input categories:
- accessing a third database configured to host a plurality of operation template computer files, each operation template computer file being associated with a transaction embedding mapping a function of an associated operation;
- determining a fourth relatedness score for each operation template computer file based on a comparison of the input embedding with the transaction embeddings of the plurality of operation template computer files;
- selecting at least one operation template computer file based on the fourth relatedness scores; and returning a set of executable operation instructions based on an application of the input to the at least one operation template computer file to the user.

7. The method of claim 6, further comprising, in response to the input category being a fourth input category, the fourth input category being distinct from the first, second and third input categories:

inputting a dynamic computer file in a machine learning algorithm (MLA), the MLA being configured to receive a dynamic computer file as an input and output a formatted data structure wrapped in a prompt generated based on the user input;

inputting the prompt to a natural language processing (NLP) service; and returning an output of the NLP service to the user.

8. The method of claim 1, wherein determining an input category comprises:

determining a confidence score for each input category for the given input, the confidence score being indicative of a probability that the input belongs to the input category; and if the confidence score is below a pre-determined threshold:

accessing a temporal series of historical input entered by the user;

identifying a first historical input directly preceding the input; and determining a second input of the first historical input, and wherein determining an input category of the input is further based on the first historical input and the second input.

9. A system for assisting a user on a computer-implemented platform, the system comprising a processor configured to:

receive a user input from the user;

determine an input category of the user input among a plurality of pre-determined input categories;

in response to the input category being a first input category:

access a first database configured to host a plurality of static computer files, each static computer file being associated with a document embedding mapping a content of the associated static computer file;

determine a first relatedness score for each static computer file based on a comparison of an input embedding associated with the user input with the document embeddings of the plurality of static computer files; and return a first indication of at least one of the static computer files based on the first relatedness scores to the user;

and in response to the input category being a second input category, the second input category being distinct from the first input category:

access a second database configured to host a plurality of executable dynamic computer files, each dynamic computer file being associated with a service embedding mapping a function of the associated dynamic computer file and each dynamic computer file being associated with a dynamic computer file category among a plurality of dynamic computer file categories comprising:

a machine learning model category, a contextual file category, a given contextual file including dynamic content of the computer-implemented platform, and a network communication service category;

determine a second relatedness score for each dynamic computer file based on a comparison of the input embedding with the service embeddings of the plurality of dynamic computer files;

execute at least one dynamic computer file of a first file category based on the second relatedness scores;

in response to an output of the at least one dynamic computer file of the first file category being invalid, execute at least one dynamic computer file of a second file category based on the second relatedness scores; and return a second indication of an output of the execution of the at least one dynamic computer file of the second file category to the user.

10. The system of claim 9, wherein returning the first indication of at least one of the static computer files based on the first relatedness scores comprises:

comparing the first relatedness scores associated with the static computer files;

identifying a set of a pre-determined number of static computer files based on the comparison;

accessing a content of the set of static computer files, the content of each static computer file comprising sections associated with a section embedding;

determining a third relatedness score for each section of the set of static computer files based on a comparison of the input embedding with the corresponding section embedding; and returning one or more sections of the set of static computer files based on the third relatedness scores.

11. The system of claim 10, wherein returning one or more sections of the set of static computer files comprises:

inputting the one or more sections and the user input into a natural language processing (NLP) service configured to receive sections of static computer files as an input; and returning an output of the NLP service to the user.

12. The system of claim 11, wherein the NLP service is further configured to:

receive a current content of the computer-implemented platform as a second input, the output of the NLP service being at least in part based on the current content.

13. The system of claim 9, wherein executing at least one dynamic computer file of a first file category based on the second relatedness scores comprises:

inputting a contextual file and the user input into a natural language processing (NLP) service, the contextual file being selected based on the input of the user; and returning an output of the NLP service to the user.

14. The system of claim 9, wherein the processor is further configured to, in response to the input category being a third input category, the third input category being distinct from the first and second input categories:

access a third database configured to host a plurality of operation template computer files, each operation template computer file being associated with a transaction embedding mapping a function of an associated operation;

determine a fourth relatedness score for each operation template computer file based on a comparison of the input embedding with the transaction embeddings of the plurality of operation template computer files;

select at least one operation template computer file based on the fourth relatedness scores; and return a set of executable operation instructions based on an application of the input to the at least one operation template computer file to the user.

15. The system of claim 14, the processor being further configured to, in response to the input category being a fourth input category, the fourth input category being distinct from the first, second and third input categories:

input a dynamic computer file in a machine learning algorithm (MLA), the MLA being configured to receive a dynamic computer file as an input and output a formatted data structure wrapped in a prompt generated based on the user input;

input the prompt to a natural language processing (NLP) service; and return an output of the NLP service to the user.

16. The system of claim 9, wherein determining an input category comprises:

determining a confidence score for each input category for the given input, the confidence score being indicative of a probability that the input belongs to the input category;

if the confidence score is below a pre-determined threshold:

accessing a temporal series of historical input entered by the user;

identifying a first historical input directly preceding the input; and determining a second input of the first historical input, and wherein determining an input category of the input is further based on the first historical input and the second input.

17. A non-transitory computer-readable medium comprising executable instructions which, when executed by at least one processor, cause the at least one processor to:

receive a user input from a user of a computer-implemented platform;

determine an input category of the user input among a plurality of pre-determined input categories;

in response to the input category being a first input category:

access a first database configured to host a plurality of static computer files, each static computer file being associated with a document embedding mapping a content of the associated static computer file;

determine a first relatedness score for each static computer file based on a comparison of an input embedding associated with the user input with the document embeddings of the plurality of static computer files; and return a first indication of at least one of the static computer files based on the first relatedness scores to the user;

and in response to the input category being a second input category, the second input category being distinct from the first input category:

access a second database configured to host a plurality of executable dynamic computer files, each dynamic computer file being associated with a service embedding mapping a function of the associated dynamic computer file and each dynamic computer file being associated with a dynamic computer file category among a plurality of dynamic computer file categories comprising:

a machine learning model category, a contextual file category, a given contextual file including dynamic content of the computer-implemented platform, and a network communication service category;

determine a second relatedness score for each dynamic computer file based on a comparison of the input embedding with the service embeddings of the plurality of dynamic computer files;

execute at least one dynamic computer file of a first file category based on the second relatedness scores;

in response to an output of the at least one dynamic computer file of the first file category being invalid, execute at least one dynamic computer file of a second file category based on the second relatedness scores; and return a second indication of an output of the execution of the at least one dynamic computer file of the second file category to the user.

* * * * *